(12) United States Patent
Chen et al.

(10) Patent No.: US 12,093,074 B2
(45) Date of Patent: Sep. 17, 2024

(54) FRAME ASSEMBLY, BACKLIGHT MODULE AND DISPLAY DEVICE

(71) Applicant: RADIANT OPTO-ELECTRONICS CORPORATION, Kaohsiung (TW)

(72) Inventors: Chih-Hsiang Chen, Kaohsiung (TW); Cheng-Te Chang, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 219 days.

(21) Appl. No.: 17/810,785

(22) Filed: Jul. 5, 2022

(65) Prior Publication Data

US 2023/0013724 A1    Jan. 19, 2023

(30) Foreign Application Priority Data

Jul. 14, 2021   (TW) .................................. 110125823

(51) Int. Cl.
   *G06F 1/16*    (2006.01)
(52) U.S. Cl.
   CPC .................. *G06F 1/1601* (2013.01)
(58) Field of Classification Search
   CPC ......... G02F 1/133317; G02F 1/133322; G02F 1/133608
   See application file for complete search history.

(56) References Cited

U.S. PATENT DOCUMENTS

| 7,097,338 | B2 * | 8/2006 | Li | G02B 6/0086 |
| | | | | 362/633 |
| 8,045,128 | B2 * | 10/2011 | Kim | G02F 1/133608 |
| | | | | 349/158 |
| 9,482,812 | B2 * | 11/2016 | Que | G02B 6/0088 |
| 2006/0171172 | A1 * | 8/2006 | Li | G02B 6/0086 |
| | | | | 362/633 |
| 2014/0063402 | A1 * | 3/2014 | Chen | G02F 1/133308 |
| | | | | 349/58 |
| 2020/0327831 | A1 | 10/2020 | Tenthorey et al. | |

FOREIGN PATENT DOCUMENTS

| CN | 101493213 A | 7/2009 |
| CN | 101660727 A | 3/2010 |
| CN | 102353016 A | 2/2012 |
| CN | 102654959 A | 9/2012 |

(Continued)

*Primary Examiner* — Jason M Han
(74) *Attorney, Agent, or Firm* — Rosenberg, Klein & Lee (57) ABSTRACT

A frame assembly has a front side, a back side, at least one first assembly and a second assembly. The first assembly has multiple assembling portions disposed at spaced intervals. The second assembly has multiple engaging portions disposed at spaced intervals, and each one of the multiple engaging portions has two engaging surfaces disposed at a spaced interval, a bottom surface connected with the two engaging surfaces, and an opening opposed to the bottom surface and located on an outer edge of the second assembly. A width between the two engaging surfaces near the opening is smaller than a width near the bottom surface. Locations of the multiple engaging portions correspond to locations of the assembling portions, and multiple assembling portions and the multiple engaging portions are capable of being engaged together. A backlight module and a display device are also provided.

16 Claims, 13 Drawing Sheets

(56) References Cited

FOREIGN PATENT DOCUMENTS

| | | |
|---|---|---|
| CN | 103591556 A | 2/2014 |
| CN | 104235698 A | 12/2014 |
| CN | 105044977 A | 11/2015 |
| CN | 105485579 A | 4/2016 |
| CN | 107085326 A | 8/2017 |
| CN | 209908911 U | 1/2020 |
| CN | 211786500 U | 10/2020 |
| TW | 200519479 A | 6/2005 |

* cited by examiner

FRAME ASSEMBLY, BACKLIGHT MODULE AND DISPLAY DEVICE

BACKGROUND OF THE INVENTION

1. Field of the Invention

The present invention relates to a frame assembly, a backlight module, and a display device, and more particularly to a frame assembly configured for a backlight module and a display device having said backlight module.

2. Description of Related Art

Nowadays, to maximize effective display areas of display devices, borders of the display devices are becoming narrower and narrower.

Figure 14:
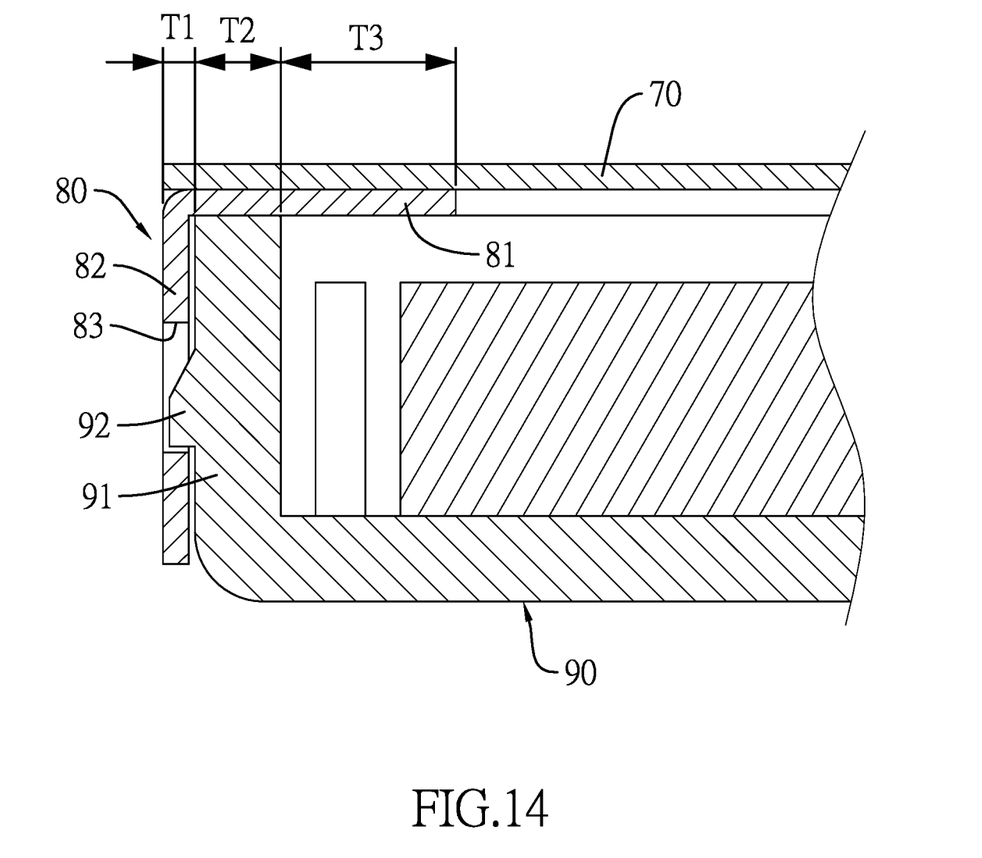
FIG. 14 is an enlarged side view in partial section of a display device in accordance with the prior art.

With reference to FIG. 14, a conventional display device has a backlight module and a panel 70 assembled on the backlight module.

The backlight module has an outer frame 80 and a fixed board 90. The outer frame 80 comprises a supporting wall 81 and an outer wall 82 downwardly extending from the supporting wall 81. The fixed board 90 has a sidewall 91 standing upwardly on a periphery of the fixed board 90. An engaging hole 83 and an engaging protrusion 92 are formed on the outer wall 82 and the sidewall 91, respectively. Thereby, the outer frame 80 can be assembled around the sidewall 91 of the fixed board 90 via the outer wall 82. The supporting wall 81 is configured for supporting the panel 70.

In order to enable the outer frame 80 to have sufficient assembly strength, the outer wall 82 needs to abut and press the sidewall 91 of the fixed board 90 so that the engaging protrusion 92 will not slide apart from the engaging hole 83. Both of the outer wall 82 and the sidewall 91 must have a certain thickness to prevent insufficiency of strength for supporting the panel 70. Therefore, borders of the conventional display device have to be larger than or equal to a sum of a thickness T1 of the outer wall 82, a thickness T2 of the sidewall 91, and part of width T3 of the supporting wall 81. However, this configuration is unfavorable for the narrow-border aim, and this problem remains to be solved.

SUMMARY OF THE INVENTION

The main objective of the present invention is to provide a frame assembly, a backlight module, and a display device to solve the problem of the backlight module of the conventional display device, which is disadvantageous for narrow-border design.

The frame assembly has a front side and a back side being opposite to the front side, and the frame assembly comprises at least one first assembly and a second assembly. The at least one first assembly has multiple assembling portions disposed at spaced intervals. The second assembly has multiple engaging portions disposed at spaced intervals, and each one of the multiple engaging portions has two engaging surfaces, a bottom surface, and an opening. The two engaging surfaces are disposed at a spaced interval. The bottom surface of the engaging portion is connected with the two engaging surfaces. The opening is opposed to the bottom surface and located on an outer edge of the second assembly. A width between the two engaging surfaces near the opening is smaller than a width between the two engaging surfaces near the bottom surface of the engaging portion. Locations of the multiple engaging portions correspond to locations of the assembling portions, and multiple assembling portions and the multiple engaging portions are capable of being engaged together.

The backlight module comprises said frame assembly, a light guiding plate, and a light source. An assembly space is formed between said first assembly and the second assembly. The light guiding plate is disposed on the second assembly. The light source is disposed on the second assembly, is adjacent to the light guiding plate, and is located in the assembly space toward the front side of the frame assembly.

The display device comprises said backlight module and a display panel. A light-emitting opening is encircled by said first assembly of the frame assembly and communicates with the assembly space. The display panel is disposed on said first assembly and is located at a front side of the light-emitting opening.

With aforementioned technical features, the first assembly and the second assembly are assembled via the assembling portions and the engaging portions. Therefore, the first assembly can be directly connected on the outer edge of the second assembly, and the backlight module can be thereby made narrow-border. Moreover, a thickness of the second assembly is thus irrelevant to a width of a border of the display device, so as to achieve the narrow-border design. By the tapering width of the engaging portion, assembly stability of said assembling portion and said engaging portion is improved, separation of said assembling portion and said engaging portion can be prevented, structural stability of the frame assembly is improved, and the backlight module has a certain assembly strength.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
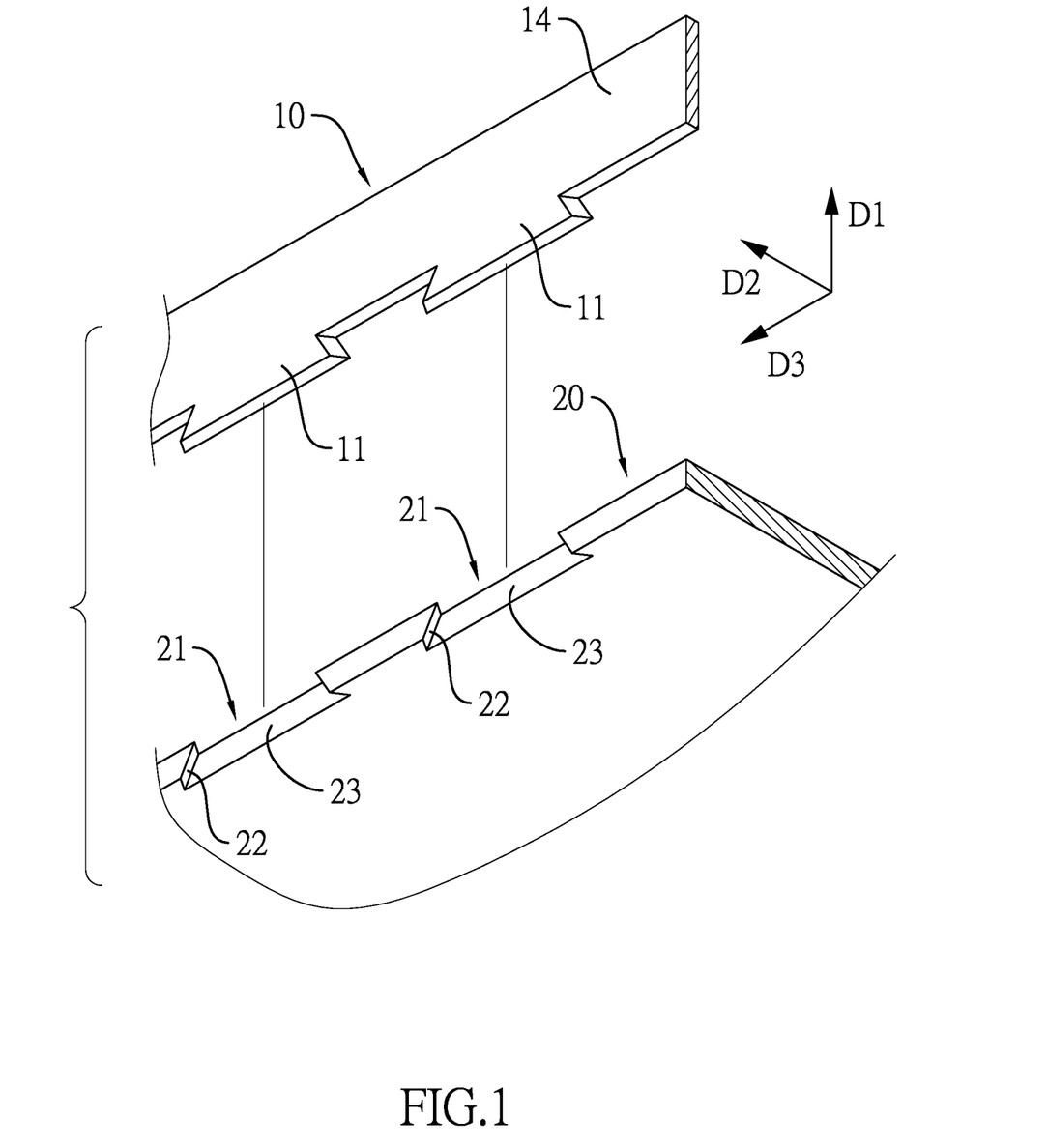
FIG. 1 is an enlarged exploded perspective view in partial section of a first embodiment of a frame assembly in accordance with the present invention.
Figure 2:
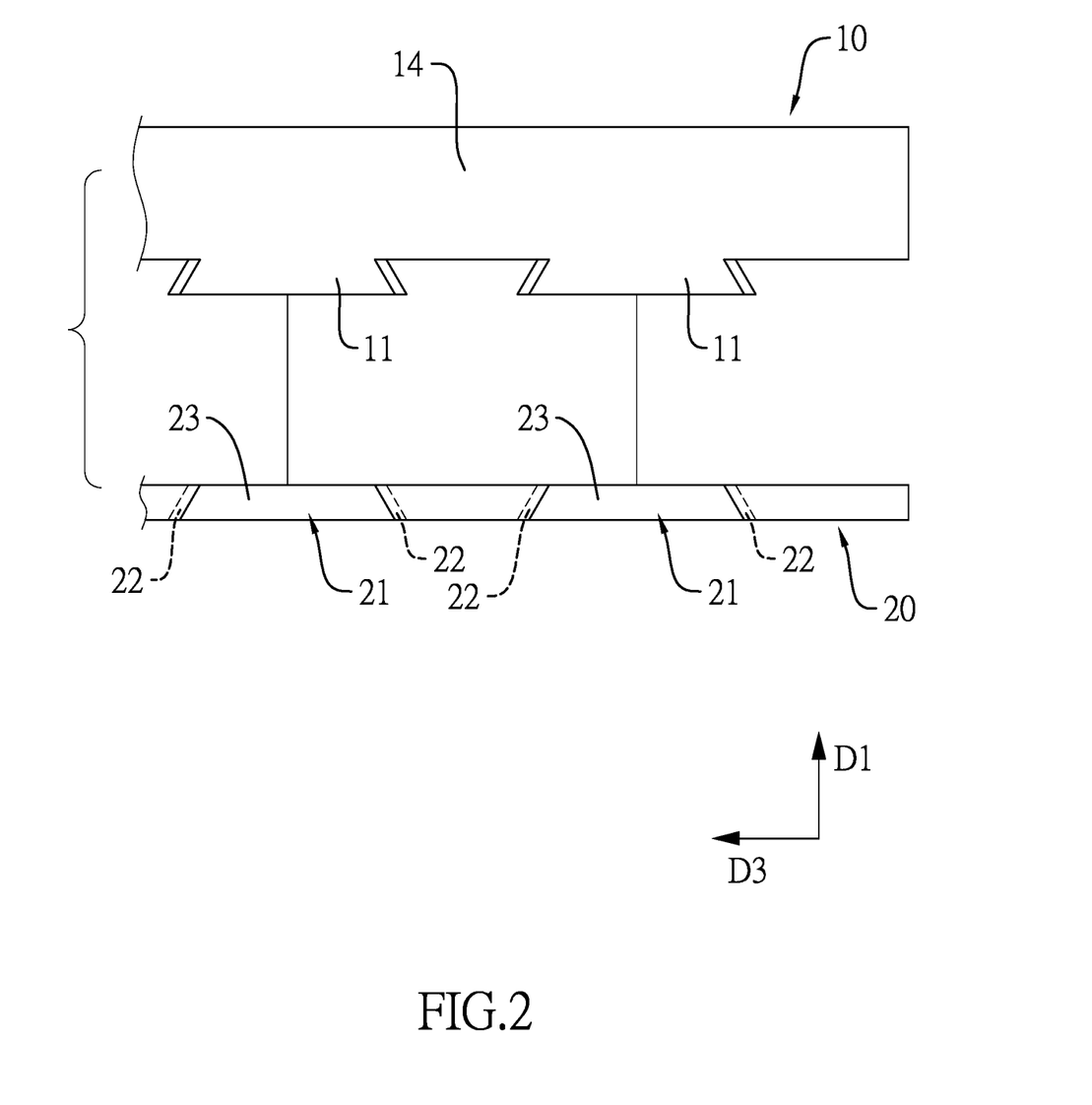
FIG. 2 is an enlarged exploded front view of the frame assembly in FIG. 1.
Figure 3:
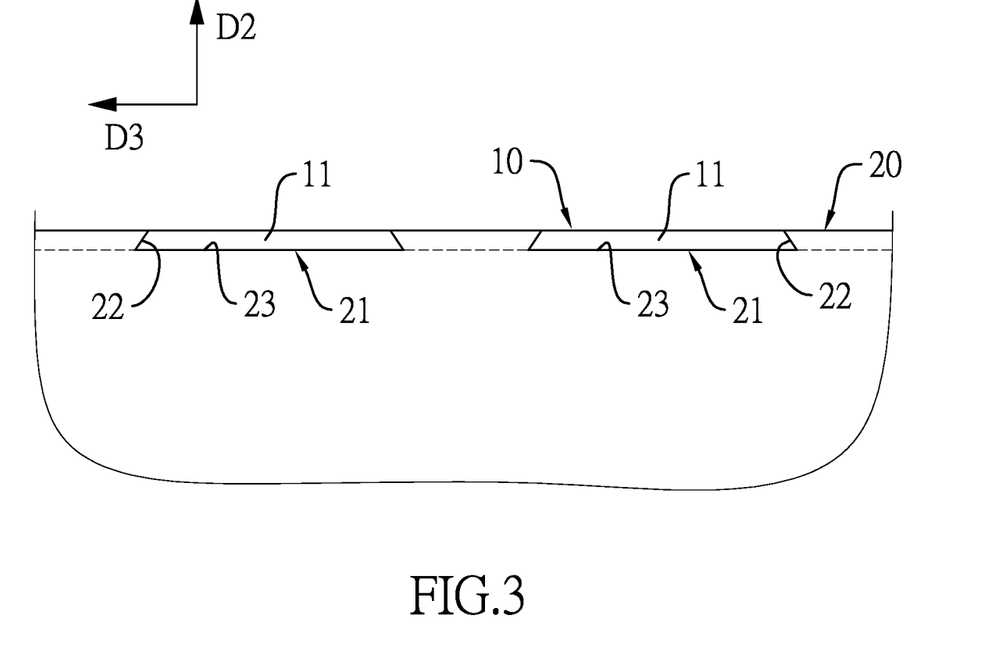
FIG. 3 is an enlarged bottom view of the frame assembly in FIG. 1.

With reference to FIGS. 1 to 3, a first embodiment of a frame assembly in accordance with the present invention has a front side and a back side being opposite to the front side, and the frame assembly comprises at least one first assembly and a second assembly. In the first embodiment of the present invention, the frame assembly is configured for a backlight module. Therefore, the front side is a light-emitting side. Said first assembly is a side frame 10, the second assembly is a back plate 20, and the side frame 10 is connected to an edge of the back plate 20. In other embodiments, the frame assembly is applicable to other technical fields other than the backlight module. That is, said first assembly and the second assembly may be components other than the side frame 10 and the back plate 20, and are not limited to embodiments of the present invention.

The side frame 10 has multiple assembling portions 11 disposed at spaced intervals, wherein the multiple assembling portions 11 are located on an edge at a back side of the side frame 10. In the present invention, the side frame 10 comprises a sidewall 14, and the multiple assembling portions 11 are located on an edge at a back side of the sidewall 14.

The back plate 20 has multiple engaging portions 21 whose locations correspond to locations of the multiple assembling portions 11. With reference to FIG. 3, the multiple assembling portions 11 and the multiple engaging portions 21 are capable of being engaged together, to prevent the multiple engaging portions 21 of the back plate 20 from separating from the multiple assembling portions 11 of the side frame 10. Thereby, the side frame 10 and the back plate 20 can be firmly assembled.

Figure 5:
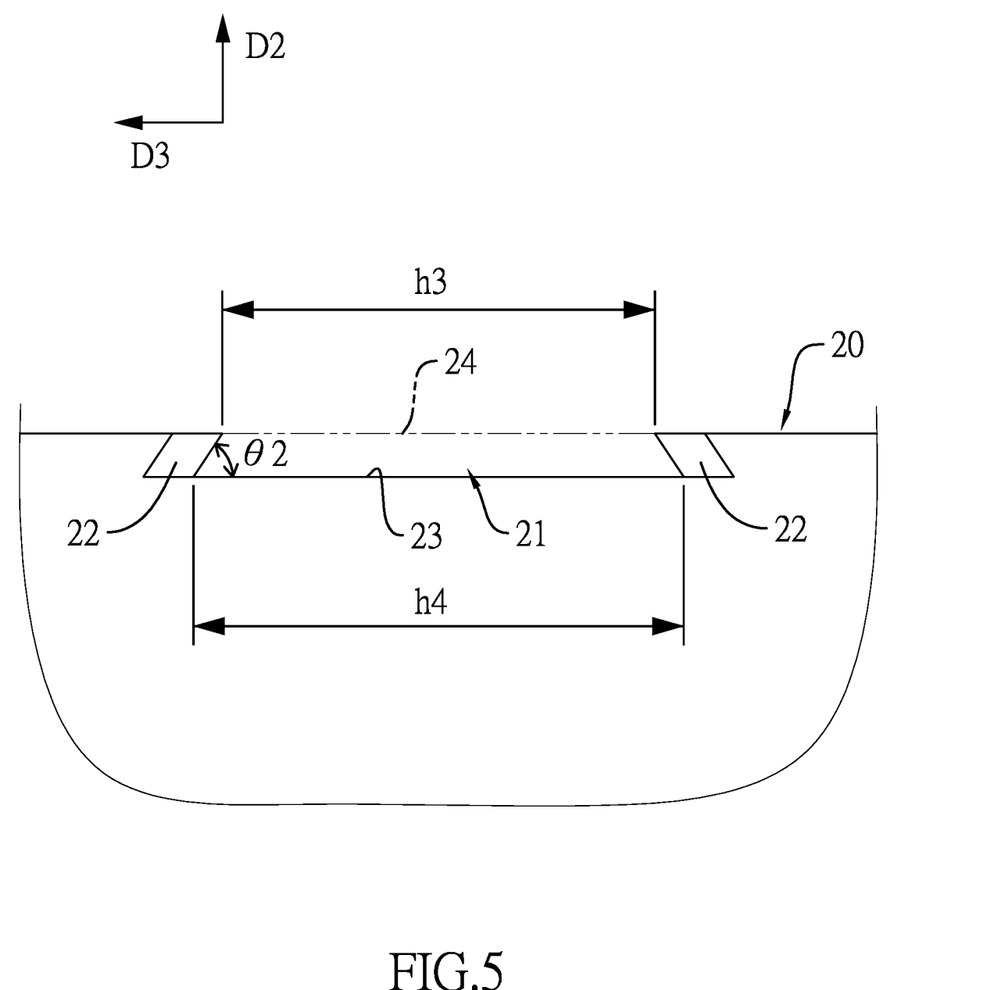
FIG. 5 is a bottom view of the engaging portion of the frame assembly in FIG. 4.
Figure 6:
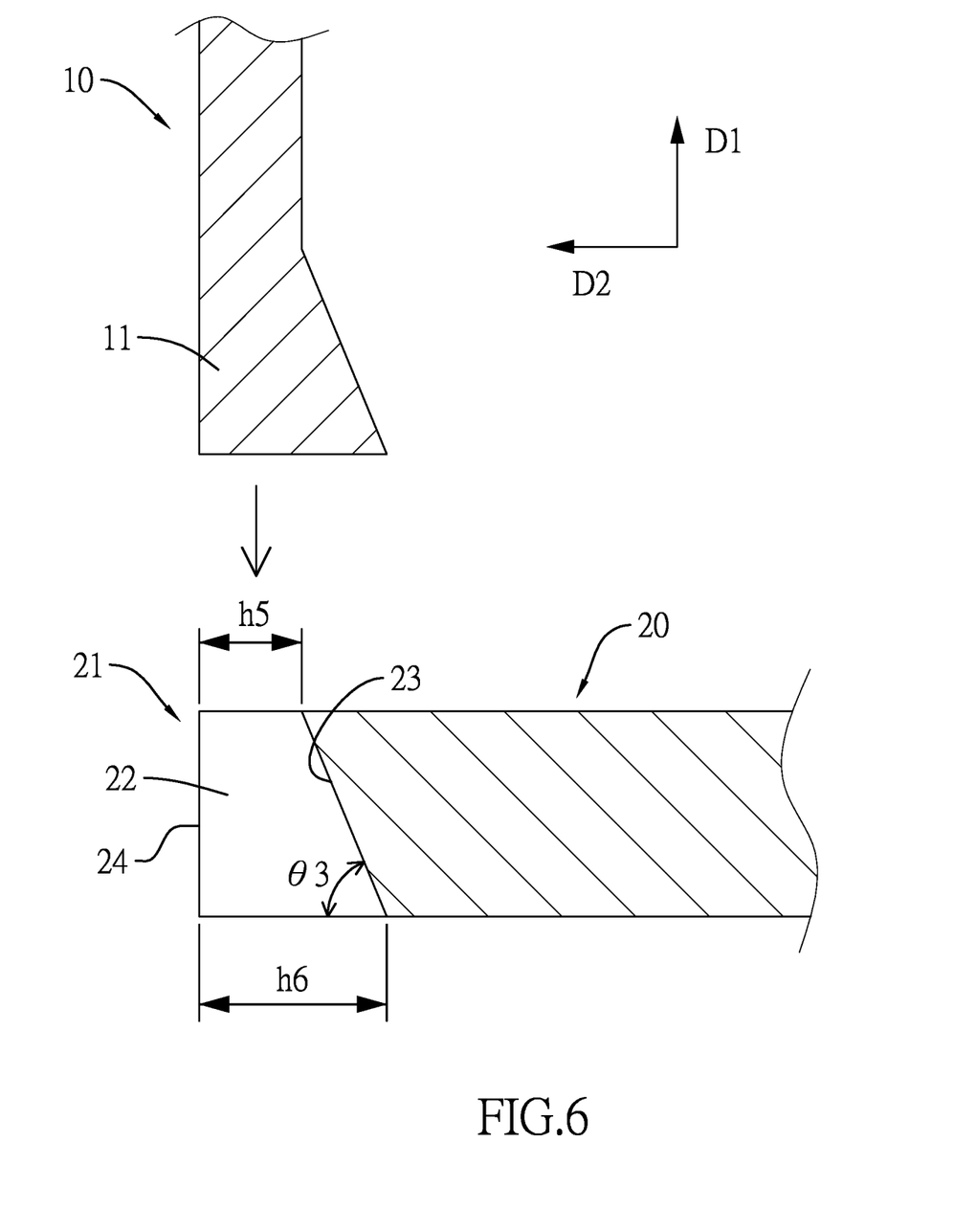
FIG. 6 is a cross-sectional side view of another configuration of the engaging portion and an assembling portion of the frame assembly in FIG. 4.
Figure 7:
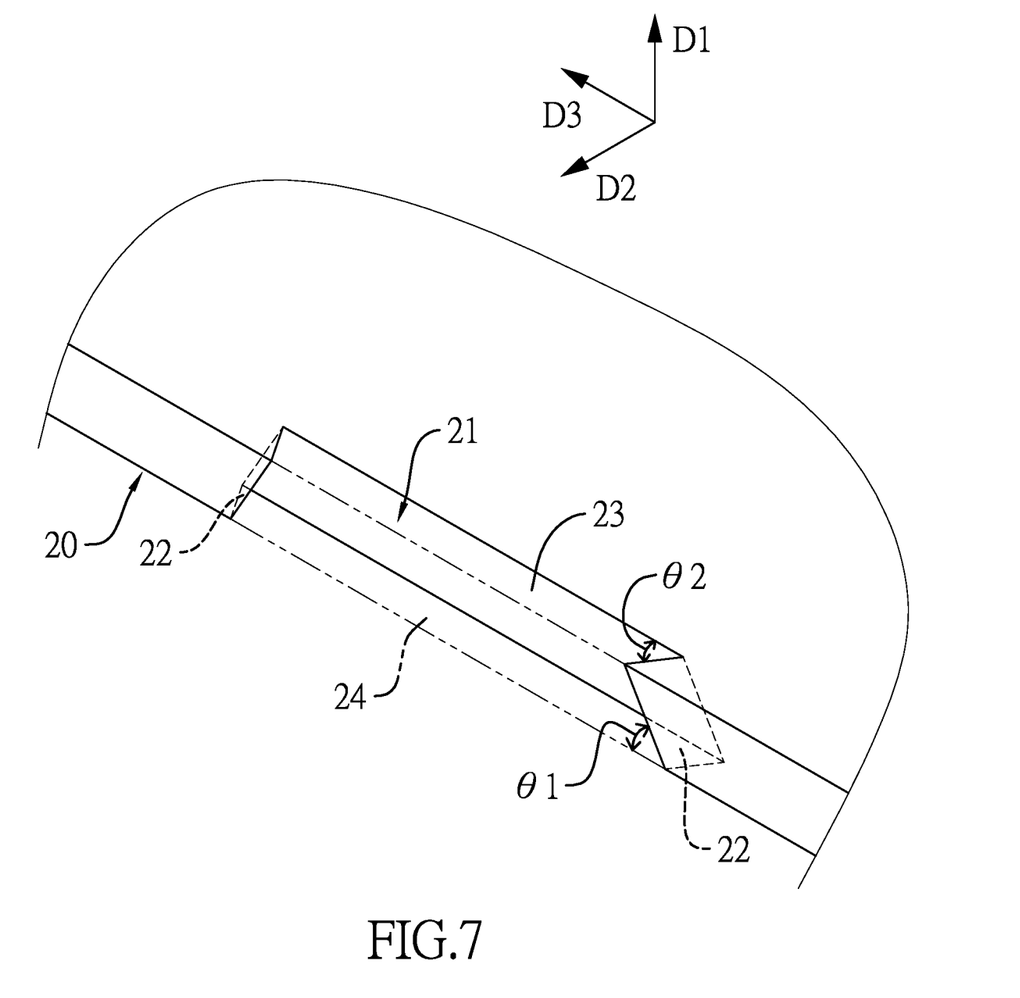
FIG. 7 is an enlarged perspective view of the engaging portion of the frame assembly in FIG. 4.

With reference to FIGS. 1, 2, and 4 to 7, each one of the multiple engaging portions 21 has two engaging surfaces 22, a bottom surface 23 connected with the two engaging surfaces 22, and an opening 24 opposed to the bottom surface 23 and located on an outer edge of the back plate 20. With reference to FIG. 7, the two engaging surfaces 22 of each one of the multiple engaging portions 21 are spaced at a width. A part of the assembling portion 11 assembled with the engaging portion 21 has a thickness.

For conciseness in description, a first direction D1 is defined as a direction extending from the back side toward the light-emitting side of the frame assembly, i.e. the back side is located at a rear side along the first direction D1, and the light-emitting side is located at a front side along the first direction D1. A second direction D2 is defined as a direction extending from the bottom surface 23 of the engaging portion 21 toward the opening 24. The bottom surface 23 is located at a rear side along the second direction D2, and the opening 24 is located at a front side along the second direction D2. Moreover, the multiple engaging portions 21 are arranged along a third direction D3 on an edge of the back plate 20 and are formed through a front side and a back side of the back plate 20. The multiple assembling portions 11 are arranged on a bottom edge of the sidewall 14 along the third direction D3 and protrude along the first direction D1. In the first embodiment of the frame assembly of the present invention, the third direction D3 is perpendicular to the first direction D1 and the second direction D2 at the same time. The first direction D1, the second direction D2, and the third direction D3 are marked in FIGS. 1 to 13.

With reference to FIGS. 1 to 4, a configuration of said assembling portion 11 corresponds to the corresponding engaging portion 21. Engagement of the assembling portion 11 and the engaging portion 21 may be point engagement or face engagement and can be selected by manufacturers according to needs. The point engagement stands for that the assembling portion 11 and the engaging portion 21 have partial contact with each other, and the assembling portion 11 and the engaging portion 21 are engaged and cannot be separated along the first direction D1 and the second direction D2. The face engagement means that the assembling portion 11 and the engaging portion 21 match and closely abut each other. Specifically, the assembling portion 11 contacts the engaging surfaces 22 or the bottom surface 23 of the engaging portion 21, so as to provide preferable assembly stability.

With reference to FIGS. 2, 3, and 7, the width between the two engaging surfaces 22 of each engaging portion 21 varies from position to position. Along a direction of assembly of the assembling portion 11 and the engaging portion 21, the width between the two engaging surfaces 22 tapers along the first direction D1. And the width between the two engaging surfaces 22 tapers along the second direction D2.

Figure 4:
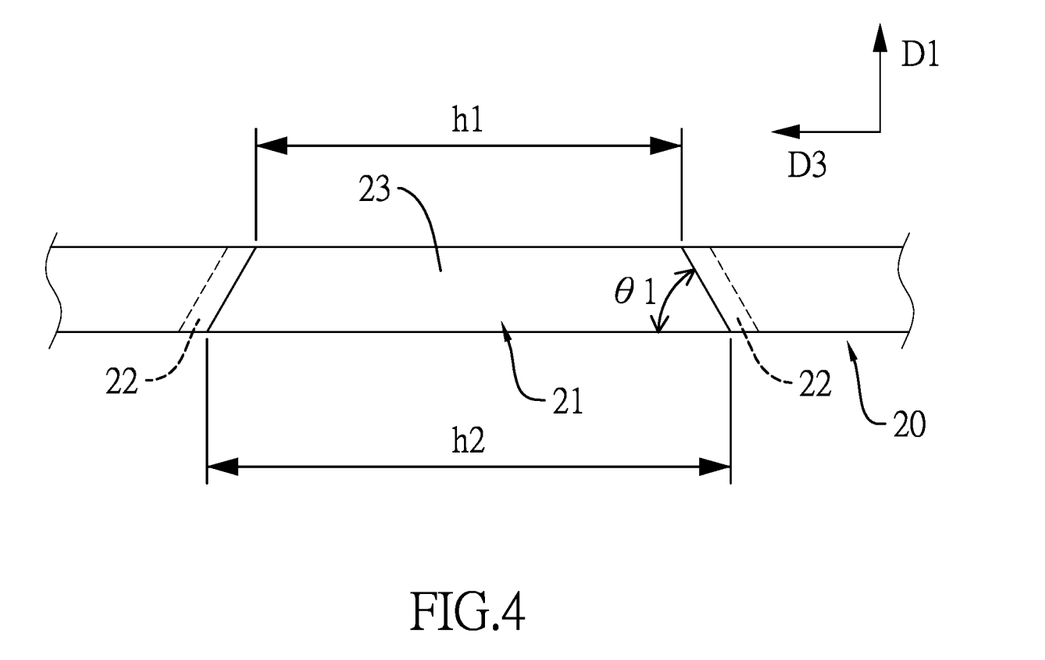
FIG. 4 is a front view of an engaging portion of the frame assembly in FIG. 1.

With reference to FIGS. 2 and 4, in the first embodiment of the frame assembly of the present invention, the two engaging surfaces 22 are spaced at a first distance h1 near the light-emitting side along the first direction D1 and are spaced at a second distance h2 near the back side along the first direction D1. The first distance h1 is smaller than the second distance h2. In this way, the assembling portion 11 will not be separated from the engaging portion 21 along the first direction D1.

With reference to FIGS. 3 and 5, the two engaging surfaces 22 are spaced at a third distance h3 near the opening 24 of the engaging portion 21 along the second direction D2 and are spaced at a fourth distance h4 near the bottom surface 23 along the second direction D2. The third distance h3 is smaller than the fourth distance h4. In this way, the assembling portion 11 will not be separated from the engaging portion 21 along the second direction D2.

With reference to FIGS. 1 to 5, since the configuration of the assembling portion 11 fits with the engaging portion 21, a width of the assembling portion 11 at a front end of the assembling portion 11 along the first direction D1 is narrow and a width at a rear end of the assembling portion 11 along the first direction D1 is wide. Furthermore, a width of said assembling portion 11 at a front end of the assembling portion 11 along the second direction D2 is narrow and a width at a rear end of the assembling portion 11 along the second direction D2 is wide. Thereby the widths of the assembling portion 11 fit with the widths of the engaging portion 21. In other words, the width of said assembling portion 11 tapers along the first direction D1 from the back side toward the light-emitting side, and tapers along the second direction D2 from the bottom surface 23 of the corresponding engaging portion 21 toward the opening 24 of the corresponding engaging portion 21.

With reference to FIG. 7, because the first distance h1 near the light-emitting side is smaller than the second distance h2 near the back side, an inclined angle θ1 is formed between said engaging surface 22 of the engaging portion 21 and a bottom side of the back plate 20, and the inclined angle θ1 is an acute angle. On the other hand, because the third distance h3 near the opening 24 is smaller than the fourth distance h4 near the bottom surface 23, an inclined angle θ2 is formed between said engaging surface 22 of the engaging portion 21 and the bottom surface 23, and the inclined angle θ2 is an acute angle.

Since the inclined angles θ1, θ2 are acute, when said side frame 10 is pried or applied by a force, said assembling portion 11 of said side frame 10 will not be separated from the corresponding engaging portion 21 of the back plate 20, providing sufficient structural strength of the frame assembly of the present invention. The multiple assembling portions 11 and the multiple engaging portions 21 are slightly deformable during engaging process, and are restored after being engaged, so as to keep tight engagement.

As a configuration of said side frame 10 in the first embodiment of the present invention, a thickness of said side frame 10 along the second direction D2 is consistent. With the first distance h1 being smaller than the second distance h2 and the third distance h3 being smaller than the fourth distance h4, the assembly stability of said assembling portion 11 and said engaging portion 21 can be secured.

With reference to FIG. 6, in another configuration of said side frame 10 and the back plate 20 of the first embodiment of the present invention, selectively, the two engaging surfaces 22 are spaced at a fifth distance h5 along the second direction D2 near the light-emitting side, and are spaced at a sixth distance h6 along the second direction D2 near the back side. The fifth distance h5 is smaller than the sixth distance h6. Therefore, an inclined angle θ3 is formed between the bottom surface 23 of the engaging portion 21 and the bottom side of the back plate 20, and the inclined angle θ3 is an acute angle. The thickness on the second direction D2 of said side frame 10 tapers from the back side towards the light-emitting side according to the inclined angle θ3. Thereby structural strength of said assembling portion 11 of said side frame 10 is improved, and said assembling portion 11 will not be easily broken off.

With aforementioned technical features, along the second direction D2 the frame assembly of the present invention only has the thickness of said side frame 10, and the structural strength is already sufficient. The back plate 20 need not be bended toward the first direction D1. Therefore, effective display areas can be expanded when the frame assembly is used on a display device, and a narrow-border effect is achieved.

In the first embodiment of the frame assembly of the present invention, the sidewall 14 of said side frame 10 is assembled to part of the outer edge of the back plate 20. That is, said side frame 10 can be connected with the back plate 20 on adjacent two or three sides of the back plate 20. Besides, multiple said side frames 10 may be utilized to be connected on different sides of the back plate 20. If said side frame 10 is integrally formed, the sidewall 14 of the side frame 10 may encircle the outer edge of the back plate 20. For instance, when a configuration of the back plate 20 is a polygon, a circle, or an arc-edged shape, said side frame 10 may accordingly be a polygonal frame structure, a circular structure, or a strip structure matching part of the outer edge of the back plate 20.

If a perimeter of said side frame 10 is slightly smaller than a total length of the outer edge of the back plate 20, when the side frame 10 is assembled to the back plate 20, the side frame 10 should be expanded outwardly to match the outer edge of the back plate 20. Thereby the assembling portions 11 of said side frame 10 can be assembled with the engaging portions 21 of the back plate 20, and the side frame 10 is tilted relative to the first direction D1. Also, due to resilient force of the side frame 10 from outward deformation, the multiple assembling portions 11 closely abut on the bottom surfaces 23 of the corresponding engaging portions 21, improving the assembly strength between the assembling portions 11 and the engaging portions 21.

Figure 8:
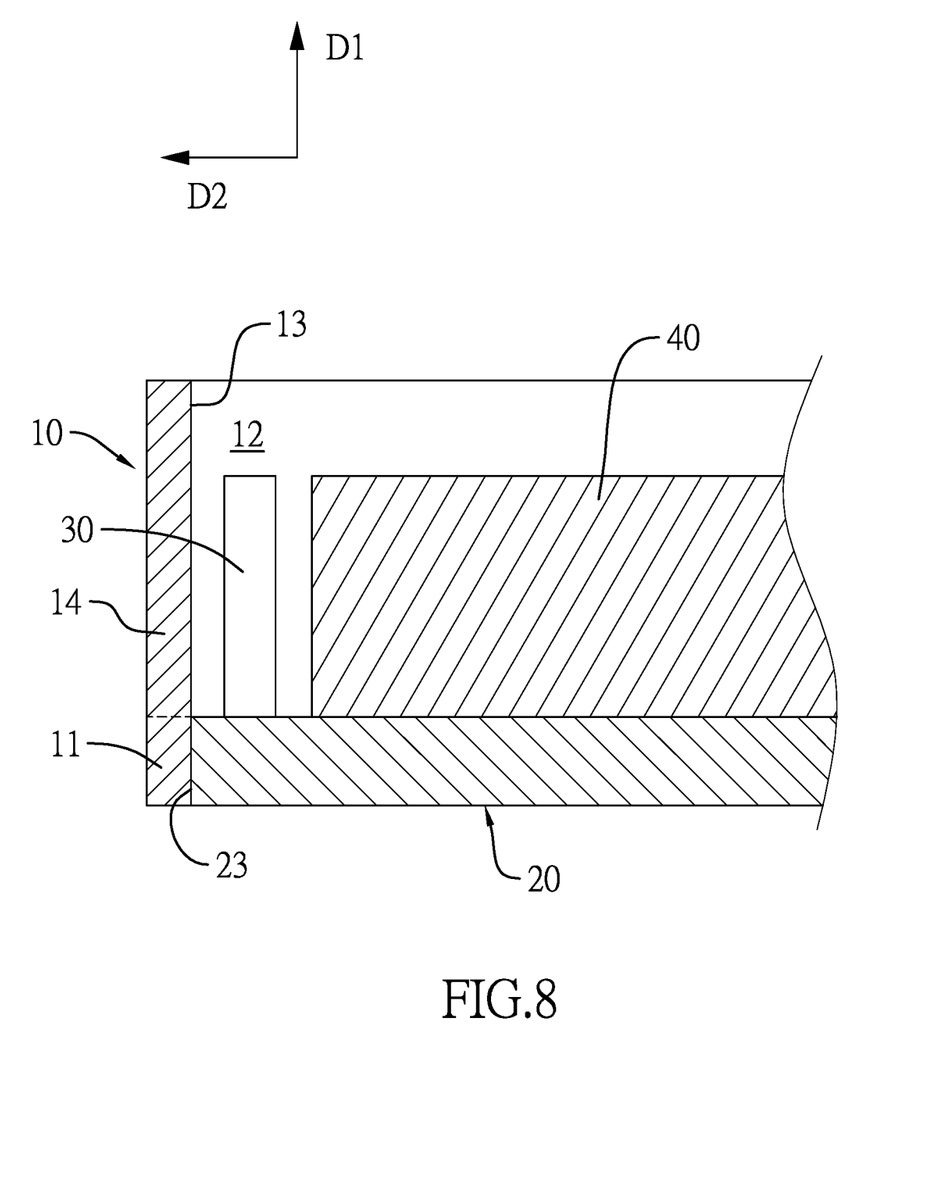
FIG. 8 is an enlarged side view in partial section of a first embodiment of a backlight module in accordance with the present invention.

The frame assembly of the present invention can be applied to either a direct-lit backlight module or a side-lit backlight module. With reference to FIG. 8, a first embodiment of a backlight module in accordance with the present invention comprises one said frame assembly and a light source 30. The side frame 10 and the back plate 20 of said frame assembly form an assembly space 12 therebetween. The light source 30 is disposed on the back plate 20 and located in the assembly space 12. For example, if the backlight module is a side-lit type, the backlight module may comprise a light guiding plate 40, and the light guiding plate 40 is disposed on the back plate 20 and located in the assembly space 12. The light source 30 is disposed adjacent to the light guiding plate 40 and emits light toward the light guiding plate 40.

Figure 9:
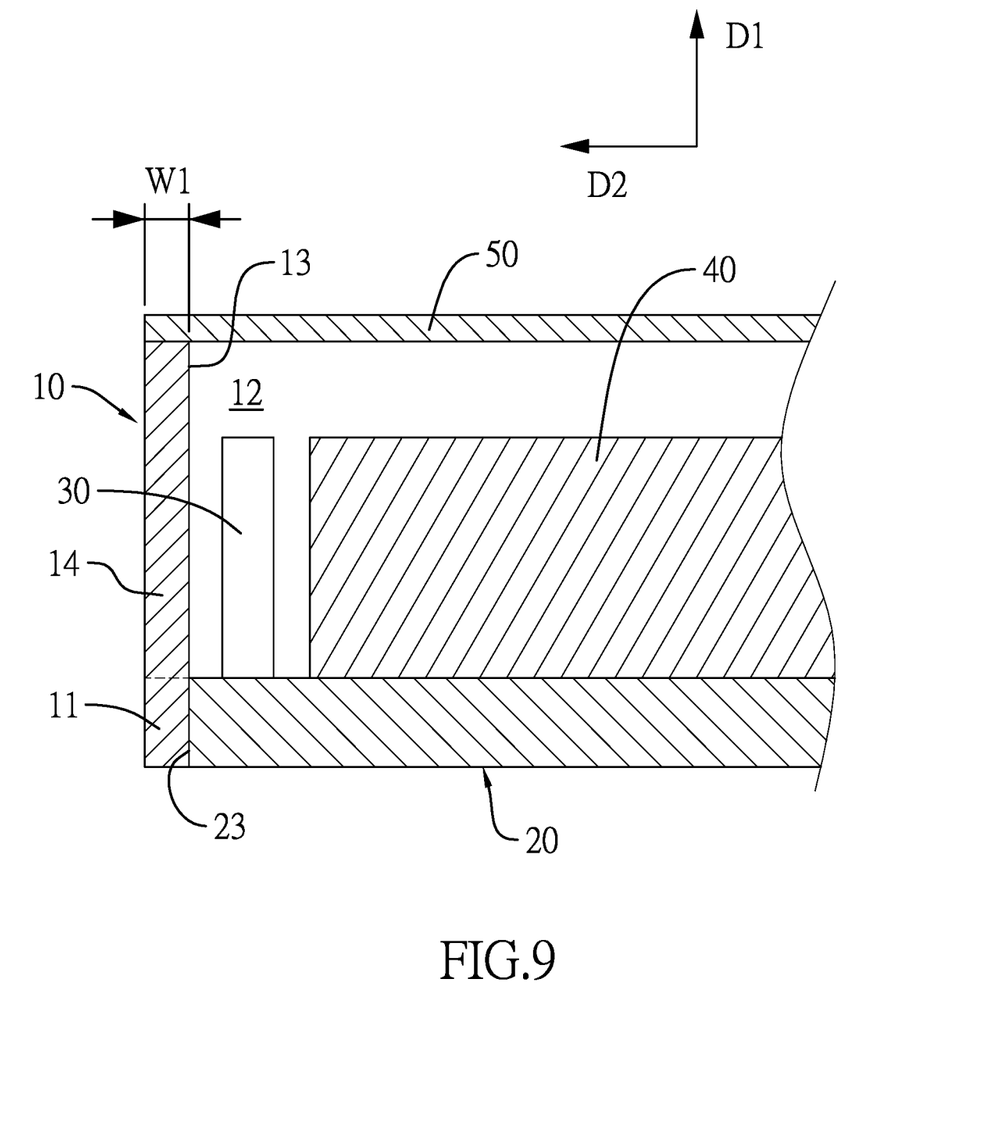
FIG. 9 is an enlarged side view in partial section of a first embodiment of a display device in accordance with the present invention.

With reference to FIG. 9, a first embodiment of a display device in accordance with the present invention comprises the aforementioned backlight module and a display panel 50. The side frame 10 of the frame assembly has a light-emitting opening 13 encircled by said side frame 10 and communicating with the assembly space 12. The display panel 50 is disposed on said side frame 10 and is located at a front side of the light-emitting opening 13. A top of said side frame 10 can support the display panel 50 directly, and a width of a border of the display device only contains the thickness W1 of said side frame 10.

Figure 10:
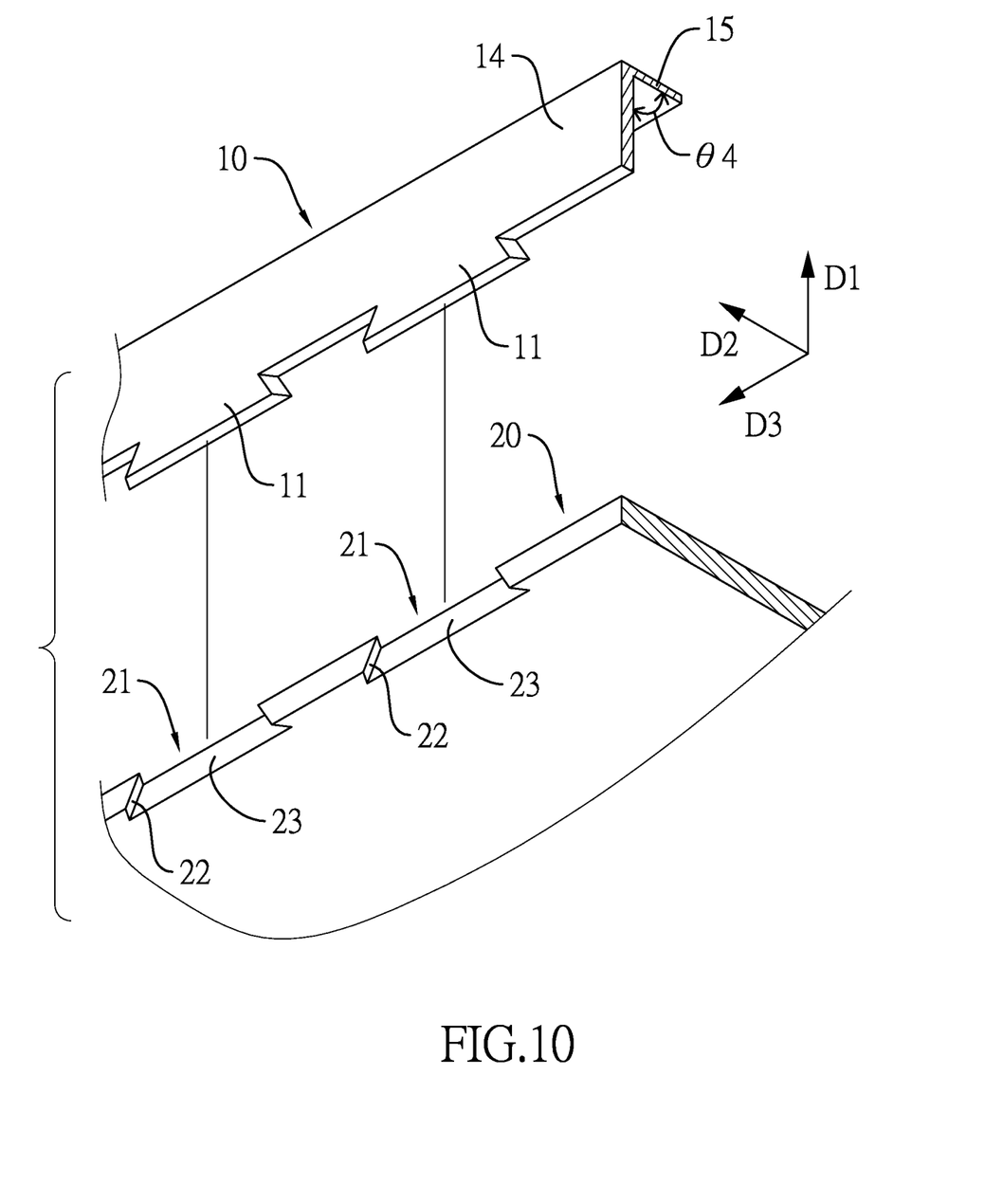
FIG. 10 is an enlarged exploded perspective view in partial section of a second embodiment of a frame assembly in accordance with the present invention.
Figure 11:
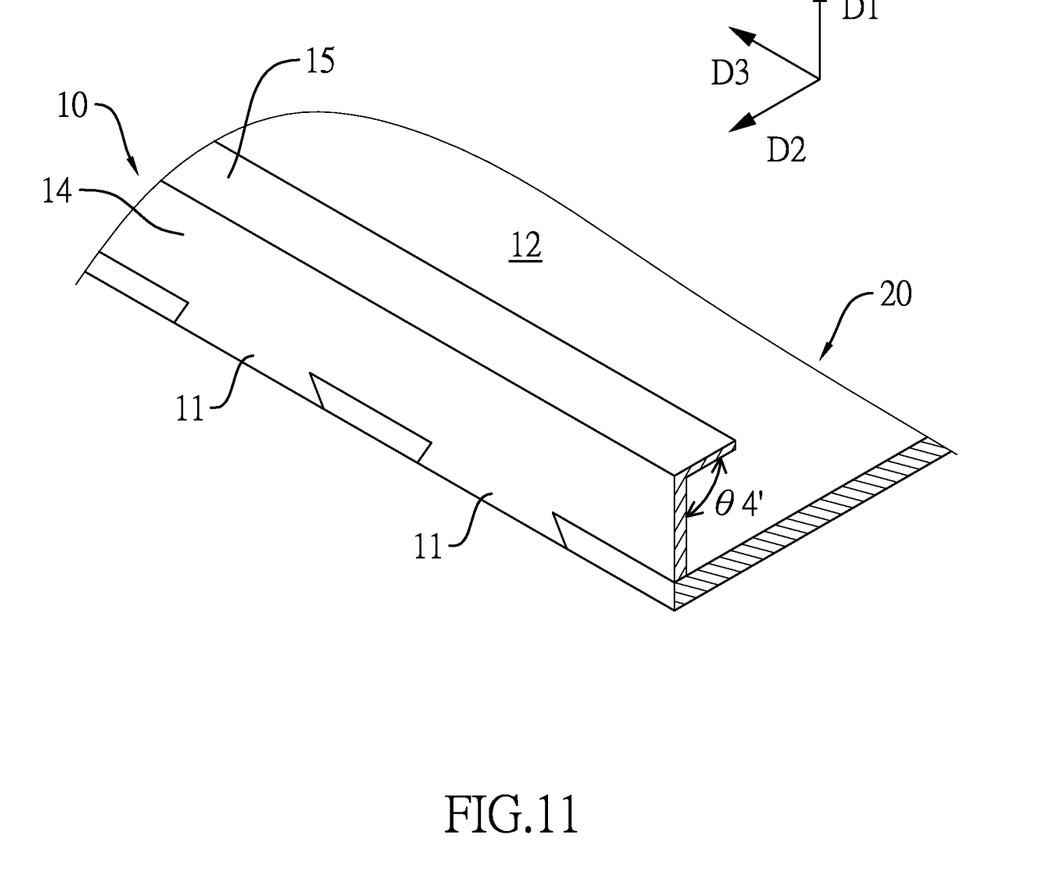
FIG. 11 is an enlarged perspective view in partial section of the frame assembly in FIG. 10.
Figure 12:
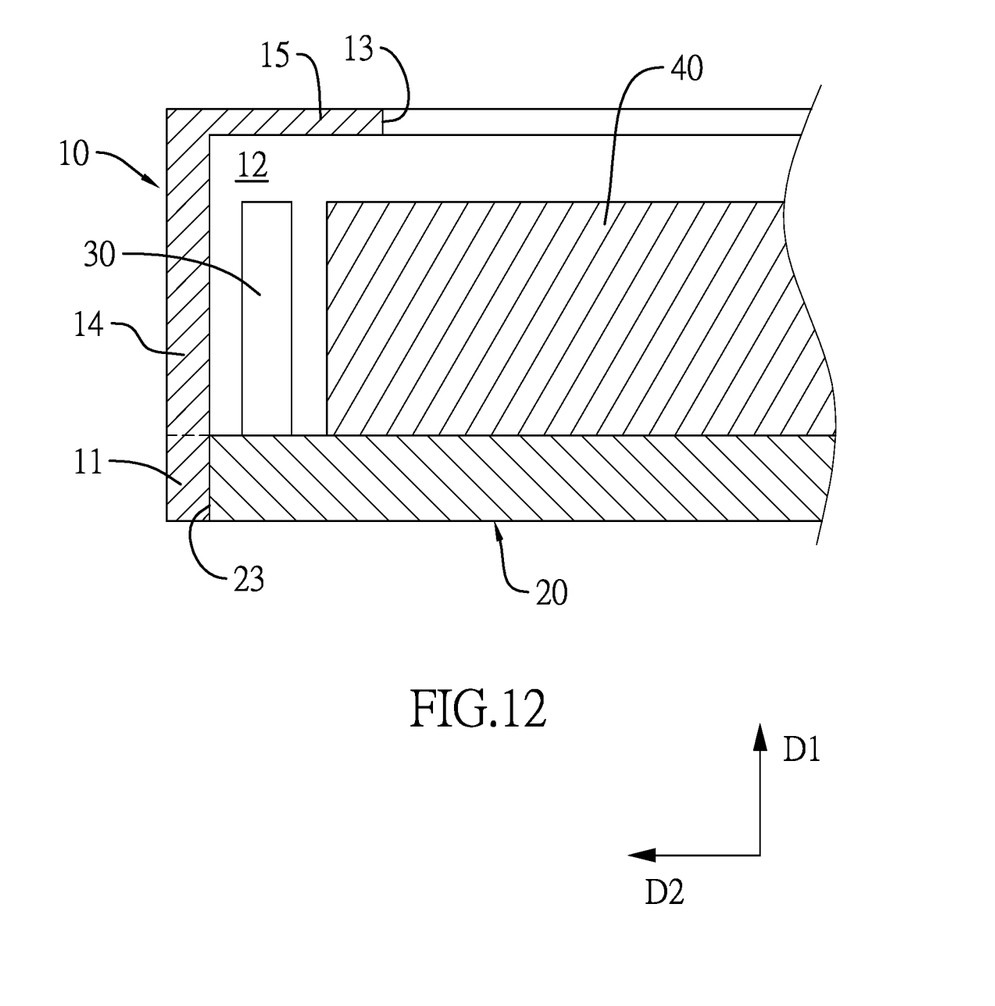
FIG. 12 is an enlarged side view in partial section of a second embodiment of a backlight module in accordance with the present invention.

With reference to FIGS. 10 to 12, in a second embodiment of the frame assembly of the present invention, said side frame 10 comprises a sidewall 14 and a supporting portion 15. The multiple assembling portions 11 are located on a bottom edge of the sidewall 14. The supporting portion 15 is disposed on the sidewall 14 at the light-emitting side of the side frame 10, and extends inwardly from a peripheral edge of the sidewall 14 along the second direction D2. The supporting portion 15 is configured for supporting the display panel 50.

With reference to FIG. 10, before the side frame 10 and the back plate 20 are assembled, an inclined angle θ4 is formed between the sidewall 14 and the supporting portion 15, and the inclined angle θ4 is smaller than or equal to 90 degrees, preferably being slightly smaller than 90 degrees. With reference to FIG. 11, when the assembling portion 11 of the side frame 10 is engaged with the corresponding engaging portion 21 of the back plate 20, the inclined angle θ4 between the sidewall 14 and the supporting portion 15 will be propelled as an inclined angle θ4'. Thereby tensions from material of the side frame 10 may provide a buckling force on two adjoining sides of the back plate 20, and the assembly strength of the multiple assembling portions 11 and the multiple engaging portions 21 may be enhanced. For example, the inclined angle θ4 may be 88 to 90 degrees, endpoints included. If the inclined angle θ4 is less than 88 degrees, when the side frame 10 is mounted with the back plate 20, stress on the side frame 10 becomes too large, and the sidewall 14 and the supporting portion 15 may be broken due to the stress. If the inclined angle θ4 is larger than 90 degrees, the side frame 10 cannot apply the buckling force on the back plate 20 and thereby cannot enhance the assembly strength between the multiple assembling portions 11 and the multiple engaging portions 21.

With reference to FIG. 12, a second embodiment of the backlight module in accordance with the present invention comprises one said frame assembly and a light source 30.

The side frame 10 and the back plate 20 of said frame assembly form an assembly space 12 therebetween. The light source is disposed on the back plate 20 and located in the assembly space 12. For example, if the backlight module is a side-lit type, the backlight module may comprise a light guiding plate 40, and the light guiding plate 40 is disposed on the back plate 20 and located in the assembly space 12. The light source 30 is disposed adjacent to the light guiding plate 40 and emits light toward the light guiding plate 40.

Figure 13:
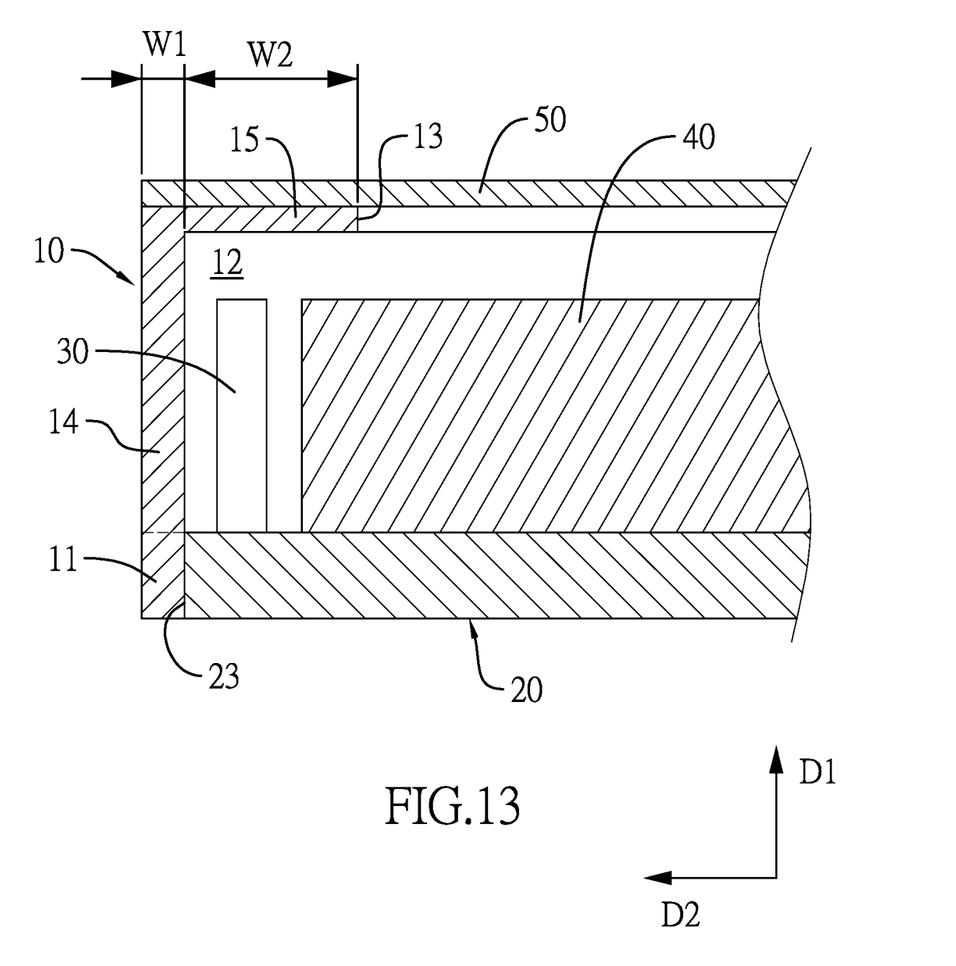
FIG. 13 is an enlarged side view in partial section of a second embodiment of a display device in accordance with the present invention.

With reference to FIG. 13, a second embodiment of the display device in accordance with the present invention comprises the aforementioned backlight module and a display panel 50. The side frame 10 of the frame assembly has a light-emitting opening 13 encircled by said side frame 10 and communicating with the assembly space 12. The display panel 50 is disposed on the supporting portion 15 of the side frame 10 and is located at a front side of the light-emitting opening 13. The supporting portion 15 supports the display panel 50, and by extending toward a center of the backlight module, the supporting portion 15 can provide enough supporting areas, improving the assembly stability for the display panel 50. A width of a border of the display device is a sum of the thickness W1 of said side frame 10 (i.e. the thickness of the sidewall 14) and a width W2 of the supporting portion 15.

With reference to FIG. 9, the width of the border of the display device in the first embodiment of the present invention is the thickness W1 of the side frame 10, and in the second embodiment of the same is the sum of the thickness W1 of said side frame 10 (i.e. the thickness of the sidewall 14) and the width W2 of the supporting portion 15. Either of the two embodiments provides the display device with a narrower border in comparison with the conventional display device. Therefore, the effective display area of the display device of the present invention is larger than that of the conventional display device. The display device of the present invention indeed meets the narrow-border demands on the market.

With the aforementioned technical characteristics, via the configuration of the frame assembly, the side frame 10 of the backlight module is directly assembled on the outer edge of the back plate 20, and provides a certain assembly strength. The backlight module can be thereby designed with a narrow border. Furthermore, the border of the display device of the present invention is thereby not effected by a thickness of the back plate 20. Based on same area on the light-emitting side of the display device, an area of the light-emitting opening 13 is increased, the effective display area is increased, and the narrow-border design is thereby accomplished.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A frame assembly having a front side and a back side which is opposite to the front side, and the frame assembly comprising:
   at least one first assembly having multiple assembling portions disposed at spaced intervals; and
   a second assembly having multiple engaging portions disposed at spaced intervals, and each one of the multiple engaging portions having
      two engaging surfaces disposed at a spaced interval;
      a bottom surface connected with the two engaging surfaces;
      an opening opposed to the bottom surface and located on an outer edge of the second assembly; and
      a width between the two engaging surfaces near the opening being smaller than a width between the two engaging surfaces near the bottom surface;
   wherein
   locations of the multiple engaging portions correspond to locations of the assembling portions, and the multiple assembling portions and the multiple engaging portions are capable of being engaged together;
   a first direction is defined as a direction extending from the back side toward the front side of the frame assembly;
   a second direction is defined as a direction extending from the bottom surface of the engaging portion toward the opening;
   the two engaging surfaces are spaced at a first distance near the front side along the first direction and are spaced at a second distance near the back side along the first direction;
   the two engaging surfaces are spaced at a third distance near the opening of the engaging portion along the second direction and are spaced at a fourth distance near the bottom surface along the second direction;
   the third distance is smaller than the fourth distance; and
   an inclined angle is an acute angle formed between said engaging surface of the engaging portion and the bottom surface.

2. The frame assembly as claimed in claim 1, wherein the first distance is smaller than the second distance; and
   an inclined angle is an acute angle formed between said engaging surface of the engaging portion and a bottom side of the second assembly.

3. The frame assembly as claimed in claim 2, wherein the width between the two engaging surfaces of each one of the multiple engaging portions tapers from the back side toward the front side along the first direction.

4. The frame assembly as claimed in claim 1, wherein the width between the two engaging surfaces of each one of the multiple engaging portions tapers from the bottom surface toward the opening along the second direction.

5. The frame assembly as claimed in claim 1, wherein a perimeter of said first assembly is smaller than a total length of the outer edge of the second assembly.

6. A backlight module comprising:
   the frame assembly as claimed in claim 1, wherein an assembly space is formed between said first assembly and the second assembly;
   a light guiding plate disposed on the second assembly; and
   a light source disposed on the second assembly, adjacent to the light guiding plate, and located in the assembly space.

7. A display device comprising:
   the backlight module as claimed in claim 6, wherein a light-emitting opening is encircled by said first assembly of the frame assembly and communicates with the assembly space; and
   a display panel disposed on said first assembly and located at a front side of the light-emitting opening.

8. A frame assembly having a front side and a back side which is opposite to the front side, and the frame assembly comprising:
- at least one first assembly having multiple assembling portions disposed at spaced intervals; and
- a second assembly having multiple engaging portions disposed at spaced intervals, and each one of the multiple engaging portions having
- two engaging surfaces disposed at a spaced interval;
- a bottom surface connected with the two engaging surfaces;
- an opening opposed to the bottom surface and located on an outer edge of the second assembly; and
- a width between the two engaging surfaces near the opening being smaller than a width between the two engaging surfaces near the bottom surface;
- wherein
- locations of the multiple engaging portions correspond to locations of the assembling portions, and the multiple assembling portions and the multiple engaging portions are capable of being engaged together;
- a first direction is defined from the back side toward the front side of the frame assembly;
- a second direction is defined from the bottom surface of the second assembly toward the opening;
- a third direction is non-parallel to the first direction and the second direction; and
- the multiple engaging portions are arranged along the third direction on an edge of the second assembly and are formed through a front side and a back side of the second assembly along the first direction.

9. The frame assembly as claimed in claim 8, wherein a width of said assembling portion tapers along the first direction from the back side of the frame assembly toward the front side of the frame assembly and tapers along the second direction from the bottom surface of the corresponding engaging portion toward the opening of the corresponding engaging portion.

10. The frame assembly as claimed in claim 8, wherein said first assembly comprises a sidewall; and the multiple assembling portions are arranged on a bottom edge of the sidewall along the third direction and protrude along the first direction.

11. The frame assembly as claimed in claim 10, wherein said first assembly comprises a supporting portion disposed on a front side of the sidewall and extending inwardly from a peripheral edge of the sidewall.

12. The frame assembly as claimed in claim 11, wherein an inclined angle between the sidewall and the supporting portion is smaller than or equal to 90 degrees.

13. The frame assembly as claimed in claim 8, wherein
- an inclined angle is an acute angle formed between the bottom surface of said engaging portion and a bottom side of the second assembly; and
- a thickness on the second direction of said assembling portion of said first assembly corresponds to the inclined angle between the bottom surface of said engaging portion and the bottom side of the second assembly and tapers from the back side toward the front side of the frame assembly.

14. The frame assembly as claimed in claim 8, wherein a perimeter of said first assembly is smaller than a total length of the outer edge of the second assembly.

15. A backlight module comprising:
- the frame assembly as claimed in claim 8, wherein an assembly space is formed between said first assembly and the second assembly;
- a light guiding plate disposed on the second assembly; and
- a light source disposed on the second assembly, adjacent to the light guiding plate, and located in the assembly space.

16. A display device comprising:
- the backlight module as claimed in claim 15, wherein a light-emitting opening is encircled by said first assembly of the frame assembly and communicates with the assembly space; and
- a display panel disposed on said first assembly and located at a front side of the light-emitting opening.

* * * * *